(12) United States Patent
Simonovsky

(10) Patent No.: US 11,484,161 B2
(45) Date of Patent: Nov. 1, 2022

(54) HAND WASHING SYSTEM AND METHOD

(71) Applicant: SOAPY CARE LTD., Rehovot (IL)

(72) Inventor: Maxim Simonovsky, Rehovot (IL)

(73) Assignee: SOAPY CARE LTD., Rehovot (IL)

(*) Notice: Subject to any disclaimer, the term of this patent is extended or adjusted under 35 U.S.C. 154(b) by 267 days.

(21) Appl. No.: 16/764,935

(22) PCT Filed: Aug. 31, 2019

(86) PCT No.: PCT/IL2019/050978
§ 371 (c)(1),
(2) Date: May 18, 2020

(87) PCT Pub. No.: WO2020/044351
PCT Pub. Date: Mar. 5, 2020

(65) Prior Publication Data
US 2020/0323397 A1    Oct. 15, 2020

(30) Foreign Application Priority Data

Aug. 31, 2018  (IT) .................. 102018000008282

(51) Int. Cl.
*A47K 5/12* (2006.01)
*G06K 7/10* (2006.01)
(Continued)

(52) U.S. Cl.
CPC ........ *A47K 5/1217* (2013.01); *G06K 7/10297* (2013.01); *G06K 7/10366* (2013.01);
(Continued)

(58) Field of Classification Search
CPC .... A47K 5/1217; A47K 2210/00; A47K 1/04; G06K 7/10297; G06K 7/10366;
(Continued)

(56) References Cited

U.S. PATENT DOCUMENTS 10,818,157 B1 * 10/2020 Koester ................ B05B 12/004
2006/0272361 A1    12/2006 Snodgrass
(Continued)

FOREIGN PATENT DOCUMENTS

| CN | 101810448 A | 8/2010 |
| CN | 102973187 A | 3/2013 |
| CN | 105311735 A | 2/2016 |

OTHER PUBLICATIONS

International Search Report International Application No. PCT/IL2019/050978, dated Nov. 12, 2019.
(Continued)

*Primary Examiner* — Sonji N Johnson
(74) *Attorney, Agent, or Firm* — The Roy Gross Law Firm, LLC; Roy Gross

(57) ABSTRACT

A hand washing system, comprising a reagent and water dispensing unit connected to a server. The dispensing unit comprises a personal identification unit, a reagent dispenser, a connection to a water source, one or more sensors for monitoring the handwashing act, and a controller comprising processor and memory for operating the dispensing unit and for storing handwashing data parameters. The server receives and analyzes handwashing data parameters. When an individual approaches the dispensing unit the identification unit identifies the individual, the one or more sensors confirm that the individual's hands are at location apt for receiving reagent from the reagent dispenser and water for at least a predetermined amount of time and the processor sends the server handwashing data parameters.

20 Claims, 7 Drawing Sheets

(51) Int. Cl.
 *G06K 7/14* (2006.01)
 *G06K 19/06* (2006.01)
 *G08B 7/06* (2006.01)
 *G08B 21/24* (2006.01)
 *G01S 17/894* (2020.01)

(52) U.S. Cl.
 CPC ......... *G06K 7/1413* (2013.01); *G06K 7/1417* (2013.01); *G06K 19/06028* (2013.01); *G06K 19/06037* (2013.01); *G08B 7/06* (2013.01); *G08B 21/245* (2013.01); *G01S 17/894* (2020.01)

(58) Field of Classification Search
 CPC ............... G06K 7/1413; G06K 7/1417; G06K 19/06028; G06K 19/06037; G08B 7/06; G08B 21/245; G01S 17/894; G06F 1/00
 See application file for complete search history.

(56) References Cited

U.S. PATENT DOCUMENTS

| | | |
|---|---|---|
| 2006/0273915 A1 | 12/2006 | Snodgrass |
| 2014/0169622 A1 | 6/2014 | Dryer et al. |
| 2014/0284358 A1 | 9/2014 | Evans et al. |
| 2015/0077258 A1 | 3/2015 | Nelson et al. |
| 2017/0294106 A1 | 10/2017 | Thyroff |
| 2018/0293873 A1* | 10/2018 | Liu ..................... G08B 21/245 |
| 2020/0320846 A1* | 10/2020 | Trapani ................. G06V 20/52 |

OTHER PUBLICATIONS

Written Opinion of the International Searching Authority, International Application No. PCT/IL2019/050978, dated Nov. 12, 2019.

* cited by examiner

HAND WASHING SYSTEM AND METHOD

CROSS REFERENCE TO RELATED APPLICATIONS

This application is a National Phase of PCT Patent Application No. PCT/IL2019/050978 having International filing date of Aug. 31, 2019, which claims the benefit of and priority to Italian Application No. 102018000008282 filed on Aug. 31, 2018 entitled HAND WASHING SYSTEM AND METHOD. The contents of the above applications are all incorporated by reference as if fully set forth herein in their entirety.

TECHNICAL FIELD

The present invention relates to a system and method for washing hands in general, and in particular to a system and method for controlling and monitoring hand hygiene practices.

BACKGROUND ART

It's been long known in the medical field that a good hand hygiene is essential maintain one's health. A person with an improper hand hygiene may contaminate people or objects he comes in contact with.

In certain locations such as hospitals, food production factories, pharmaceutical factories, restaurants and the like, hand hygiene by employees is critical as infections and contaminations in such premises can have devastating and at times life-threatening effects.

Health authorities typically issue recommendations and guidelines for handwashing practices in such environments, but there is no system today that can verify and confirm that an employee has washed his hands in the proper and desired way. There is thus a need in the industry for a system that can control and monitor hand hygiene practices of an individual.

SUMMARY OF INVENTION

It is an object of the present invention to provide a system and method for controlling and monitoring hand washing by an individual.

It is a further object of the present invention to provide a system and method for controlling and monitoring hand washing by an individual by identifying and registering when an individual washed his hands.

It is another object of the present invention to provide a system and method for controlling and monitoring hand washing by an individual by controlling the amount of reagent and water dispensed.

It is yet a further object of the present invention to provide a system and method for controlling and monitoring hand washing by an individual by controlling the amount time spent washing hands.

It is yet another object of the present invention to provide a system and method for controlling and monitoring hand washing and collecting and analyzing handwashing data.

It is yet a further object of the present invention to provide a system and method for guarantying compliance with handwashing legal requirements.

The present invention relates to a hand washing system, comprising:

(i) an integrated reagent and water dispensing unit comprising:

a) a personal identification unit comprising a tag reader or a biometric identification module;
b) a reagent dispenser comprising multiple slots for holding multiple reagent cartridges;
c) at least one reagent cartridge comprising a cleaning reagent and a sensor for identifying the specific cleaning reagent;
d) a connection to a water source;
e) one or more sensors for monitoring the handwashing sequence;
f) a controller comprising a processor and memory for managing the unit's operations and for storing handwashing data parameters; and (ii) a server connected to said reagent and water dispensing unit for receiving and analyzing handwashing data parameters, wherein when an individual approaches the integrated reagent and water dispensing unit, the personal identification unit identifies the individual, the controller send's the individual's information to the server and receives a handwashing sequence assigned to the individual according to his profile, the reagent and water dispensing unit dispenses one or more cleaning reagents and water according to said hand-washing sequence assigned to the individual, the one or more sensors confirm that the individual has performed the assigned hand-washing sequence correctly and the processor sends the server handwashing data parameters.

In some embodiments, the personal tag is a Radio Frequency Identification (RFID) tag, a Near Field Communication (NFC) tag, a magnetic card, a card with a smart chip, a card with a visual symbol (such as a barcode or QR).

In some embodiments, the personal tag comprises a status indicator.

In some embodiments, the status indicator issues a visual or audible alert when it is determined that the individual wearing the personal tag should go to wash his hands.

In some embodiments, the user's mobile phone can be used both to identify/authenticate the user and also to store and retrieve data about the user.

In some embodiments, the alert is issued after a predetermined time from the last registered hand washing, when in proximity to a predetermined person, object or location, after a predetermined action, or any combination thereof.

In some embodiments, the biometric module comprises one or more: cameras, Time-of-Flight (ToF) cameras, voice recognition sensors, touchless fingerprints sensors, face recognition modules, iris identification sensors.

In some embodiments, the assigned hand-washing sequence takes into consideration regulatory requirements and allergies and sensitivities of the individual.

In some embodiments, the one or more sensors comprise a camera, infrared sensors, volume sensors or acoustic sensors.

In some embodiments, the cleaning reagent comprises soap, foam, a chemical sanitizing reagent, a biological sanitizing reagent, a sanitizer or any combination thereof.

In some embodiments, handwashing data parameters comprise: personal tag identification, name associated with personal tag, dispensing unit identification, date and time, location, and duration of handwashing.

In some embodiments, the hand-washing sequence requires the individual to move his hands in a predetermined way in one or more steps of the sequence.

In some embodiments, the one or more sensors confirm that the individual moved his hands in the predetermined way in one or more steps of the sequence.

A compliance score is produced by comparing the user's hand movements pattern (as recorded by the sensors) to the required hand movements pattern, as specified in the assigned handwashing sequence.

In some embodiments, the system's feedback of how well a user has washed his hands (i.e., compliance score) is used the work environment, for example, opening a door (handwashing compliant to requirements), not opening a door (handwashing not compliant), activating an alarm or a visual indicator or any other indicator (for the user and/or other members like a supervisor).

The present invention also relates to a hand washing method comprising the steps of:
  (i) identifying an individual;
  (ii) sending the individual's identification and location to a server;
  (iii) receiving from the server a hand-washing sequence for the individual according to his profile;
  (iv) dispensing one or more cleaning reagents and water according to said hand-washing sequence assigned to the individual;
  (v) confirming via one or more sensors that the individual's hands are at location apt for receiving reagent and water and that the individual moved his hands in the predetermined way in one or more steps of the sequence;
  (vi) sending to a server handwashing parameters.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized, and structural changes may be made without departing from the scope of the present invention.

The present invention relates to a hand washing system. The system is adapted for controlling and monitoring hand washing, in particular at locations such as hospitals or other healthcare establishments, food production factories, restaurants and other locations where personal hygiene is critical and legally regulated.

Figure 1:
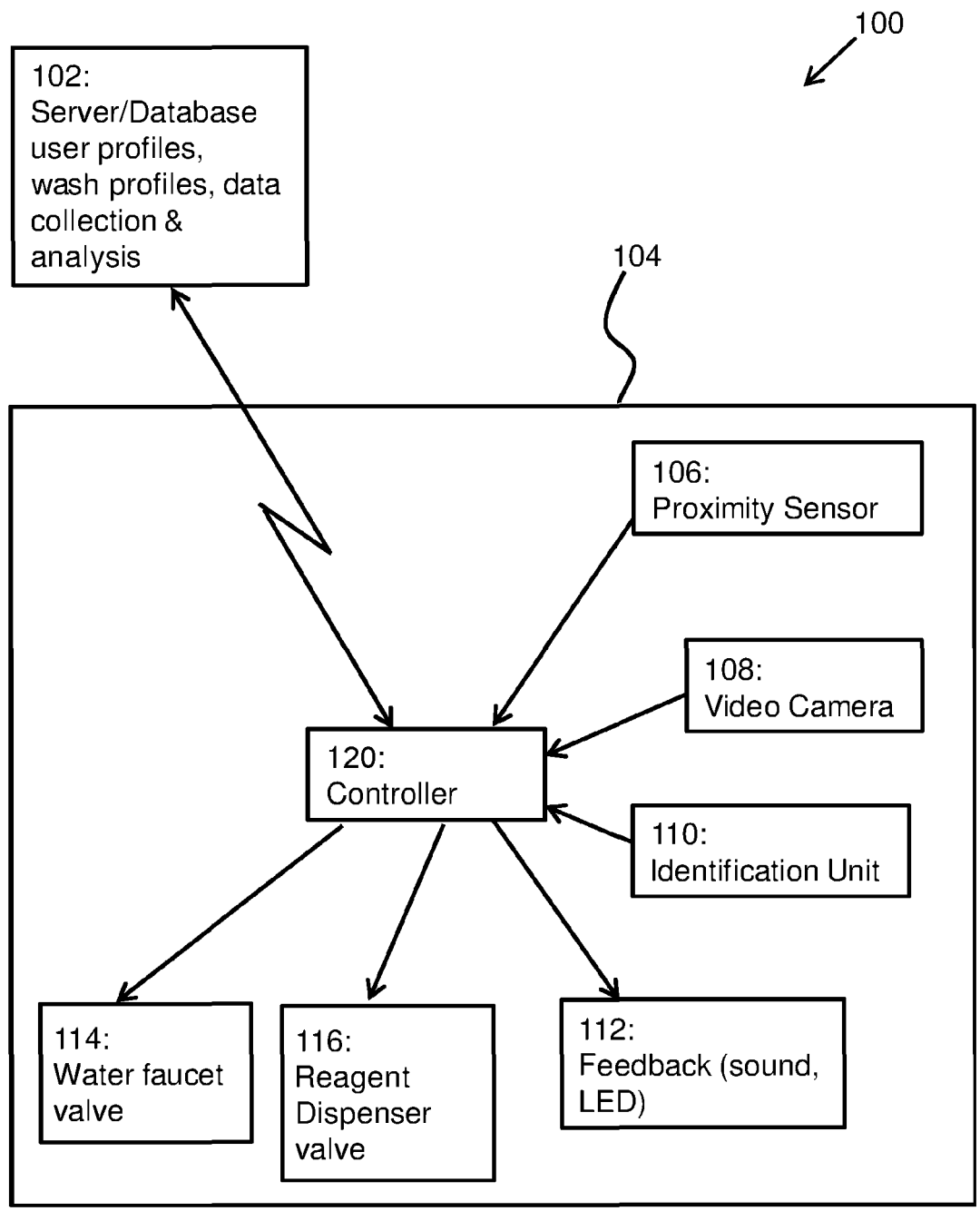
FIG. 1 is a block diagram of a hand washing system comprising a water source, a water and reagent dispenser and a usage data collection and analysis modules according to an embodiment of the invention.

FIG. 1 is a block diagram of a hand washing system 100 according to an embodiment of the invention. A dispensing unit 104 is connected to a water source via a water faucet valve 114. The water source can be of any kind, for example, a connection to the city water supply, a local container (filled with water manually or through other means) etc. Users coming to wash their hands on the system are typically detected automatically by proximity sensors 106 such as motion sensors, volume sensors, heat sensors etc. In some embodiments, a single sensor can perform the proximity detection and user recognition in a single step. Alternatively, a user may active the system manually, for example, by pressing a Start button. The user is then identified automatically by the identification unit 110. The identification unit 110 typically comprises a biometric identification module that can identify an individual via one or more cameras 108 or via any biometric identification techniques (fingerprint, iris, face recognition, voice recognition etc.). Alternatively, the identification can be performed via User ID tags users wear (bracelet etc.) or carry (a card, via a mobile phone etc.).

The unit 104 comprises a controller 120 comprising a processor and memory for controlling the different sensors 106, 108, the identification unit 110, the dispensing of water and cleaning reagents, the communication with the server 102 and for receiving and analyzing handwashing data parameters.

Once the user is identified and authenticated either locally or via a remote server 102, the system assigns a hand-washing sequence to the user. The hand-washing sequence takes into consideration any requirements such as the legal requirements, the procedures of the establishment, and also known allergies, sensitivities or necessities of the user (documented in his user profile in the system). The handwashing sequence specifies a washing sequence in terms of one or more cleaning reagents (one or more types of reagent, foam and the likes) dispensed via the Reagent Dispenser valve 116, and water dispensed (including water temperature). The hand-washing sequence may also specify the exact hand movement required in one or more steps. The water temperature may also be controlled when the dispenser 104 comprises a water heating element (not shown).

The system then initiates an automatic handwashing operation by releasing one or more cleaning reagents (soap, foam, chemical sanitizer, biological sanitizer, sanitizer or any combination thereof) and water in the right measures for the predetermined amount of times.

The system includes one or more motion sensors 106 that confirm that the individual actually moved his hands in the predetermined way in one or more steps of the hand-washing sequence.

For example, the user's hands can be recognized via video or photos recording.

The hands are inserted into the unit 104 and recognized by the sensors 106, 108 (proximity sensors, volume sensors, heat sensors, still camera, video camera etc.).

Video/Image recording is performed during each movement of the hand-washing sequence.

The video/image files are processed using image recognition techniques to produce a hand movements pattern set of parameters.

The hand movements pattern during the entire hand washing cycle is compared to a predefined pattern set of parameters—that is according to the regulatory, legal and local guidelines.

A level of matching between the performed hands movements and the predefined set parameters is calculated, and a hand-washing score is produced. The score can indicate the level of conforming to the requirements and the score may also be considered as conformed to requirements if the level of matching is not below a defined threshold.

In order to prepare a predefined pattern set of parameters, machine learning tools are used to train the system's algorithms with various images/videos of hands movements (both conforming to requirements and not conforming to requirements).

The predefined pattern set of parameters can include:

Time—total time in front of the dispensing unit or at the facility and/or lathering and/or rinsing, or a specific time for one or more steps of the hand-washing sequence.

Water—the total volume of water consumed during the washing operation, the actual water volume used by the user for hand wash.

Lathering—Movements pattern according to different lathering patterns, steps and repetitions according to different lathering patterns.

Reagents—types (Plain Soap, Antimicrobial Soap, Biodegradable soap, Scrub Soap, Foam, Alcohol-based disinfection agents, Bio-Based disinfection agents, Iodine or another disinfection agent) and volume.

Water Temperature—range of temperatures according to regulations (For example 102° F. by FDA).

Rinsing Steps—water volume during each rinse according to different rinsing patterns, number of rinse repetitions according to different rinsing patterns.

Drying—number of paper towels and hand drying quality.

Time of Flight (ToF)—Building a Unique 3d Map of Hands Movements Using Light Flight Time.

The hands are inserted into the system and recognized by the sensors

A ToF camera sends light toward the hands and the reflected light is collected with a special lens.

The time it takes for the light to bounce back is then measured and a 3D map of hands movements is built.

A 3D map is built for the entire wash cycle and with the use of an algorithm is compared with a predefined (according to the regulatory guidelines) 3D map of hands movements. The system uses machine learning methodologies to train the system with compliant and non-compliant hand movements, so that the system can continuously track the user's hand movement and their conformity with the requirements.

The level of matching between the performed hands movements and the predefined 3D map of hands movements is calculated and stored.

A single hand-washing step or the entire washing operation is considered conforming to requirements if the level of matching is not below a predetermined threshold level. The system may produce a Pass/Fail report and/or indicate the exact degree of compliance to regulations. The system's output can be used to influence or initiate actions such as: authorize to open a door, refuse to open a door, instruct user to repeat handwashing procedure etc.

In order to prepare a predefined 3D map of hands movements, machine learning tools are used to train the system's algorithms with various 3D maps of hands movements.

Handwashing usage data, including user ID, date, time and location are transmitted to the remote server 102 which stores and analyzes all user data.

The system comprises a reagents and water dispensing unit 104 connected to a server 102. If the connection to the server 102 is not available temporarily the dispensing unit 104 may be operated locally though not all functionality may be available. For example, the user profile on the server 102 may not be reached and the last local parameters for the users will be used. There may be one or more reagent and water dispensing units 104 per location. The connection to the server 102 may be any wired or wireless connection of the art (telephone, internet connection, SMS etc.).

The reagent and water dispensing unit 104 comprises:
a personal identification unit 110, which can use a personal tag reader and/or biometric identification as described above;
a reagent dispenser comprising multiple slots for holding multiple reagent cartridges;
at least one reagent cartridge comprising a cleaning reagent (plane soap for example) and a sensor for identifying the specific cleaning reagent;
a connection to a water source 114;
one or more sensors 106, 108 for monitoring the handwashing act sequence; and
a processor and memory for storing handwashing data parameter.

Each reagent cartridge used in the system comprises an integrated sensor for identifying and authenticating the cleaning reagent in the cartridge.

The reagent and water dispensing unit 104 may comprise a feedback 112 output such as a LED and/or speaker that can indicate different stages to the user or give feedback (for example, put hands in, take hands out, rub hands in a certain way, procedure done correctly, error etc.).

When a person approaches the integrated reagent and water dispensing unit 104, the proximity sensors 106, 108 communicate a presence to the personal identification unit 110 that identifies the individual via the user's personal tag or via biometric identification. The tag identification and confirmation of the tag owner is typically performed locally by the tag reader but it also possible that the tag reader reads the tag and then sends the tag ID to a remote server for confirmation of the tag owner.

The personal tag can be a Radio Frequency Identification (RFID) tag, a Near Field Communication (NFC) tag, a magnetic card, a card with a smart chip, a card with a visual symbol (such as a barcode or QR), cellular phone.

In some embodiments, the personal tag is adapted to be worn by the wrist of the individual, for example, in a bracelet or any other wearable form.

In some embodiments, the personal tag comprises a status indicator, for example, "clean" (for OK status), "dirty" (when handwashing should be performed), or any other status indicator.

In some embodiments, the status indicator issues a visual and/or audible alert when it is determined that the individual wearing the personal tag should go to wash his hands. The alert can be issued on certain circumstances, for example, after a predetermined time from the last registered hand washing, when in proximity to a predetermined person (such as a doctor to a patient) or object (such as near a food supply) or location (such as entering a surgery room), after a predetermined action (after leaving the bathroom), or any combination thereof.

Typically, the personal tag reader reads personal tags only at a close proximity, for example, from a distance of 0.5 meters or less.

In some embodiments, the handwashing operation only commences after the personal tag has been identified and confirmed by accessing an authorization database. The authorization database may be stored locally or accessed remotely.

The reagent and water dispensing unit 104 also comprises one or more sensors 106, 108 to confirm that the individual's hands are at location apt for receiving reagent from the reagent dispenser 116 and water for at least a predetermined amount of time. The reagent and water may be dispensed automatically after the person is identified and the one or more sensors 106, 108 confirm that the person's hands are at the right location for receiving the dispensed reagent and water. The one or more sensors 106, 108 can include a camera, infrared sensors, volume sensors, acoustic sensors or any combination thereof. The one or more sensors 106, 108 confirm that the hands are at the right position for receiving reagent and water for the predetermined time for handwashing (typically as determined by the regulations for the establishment and person).

Reagents and water can be dispensed in several cycles during a single handwashing operation. The duration of each reagent dispensing or water dispensing in each cycle can be programmed to a different value as decided by the service operator. The one or more sensors 106, 108 validate during each cycle that the person's hands are still in washing location (where reagent and water can be dispensed to the hands).

The server 102 comprises (or is coupled to) a database for managing user profiles and hand-washing sequences. The user profile can include information about known allergies, sensitivities and particular necessities of that user. Hand-washing sequences are assigned based on the user profile, location of the dispenser 104, legal/regulatory requirements and also particular requirements of the establishment where the reagent dispenser 104 is operated.

Figure 2:
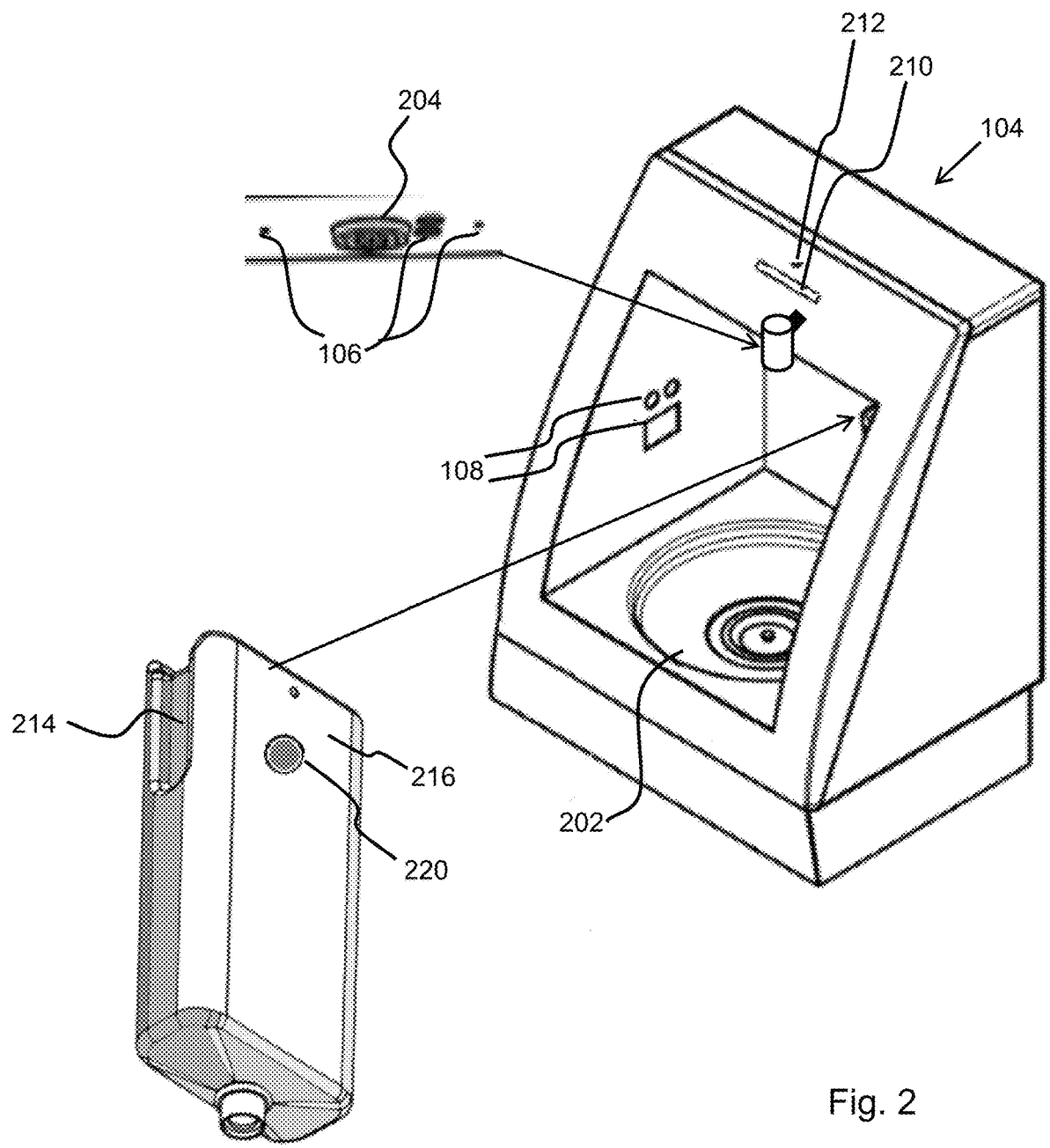
FIG. 2 shows the structure of an embodiment of a reagent dispenser.

FIG. 2 is an example of a reagent dispenser 104 with a reagent cartridge 216. The reagent dispenser 104 is locked by a self-recognition tooth pattern. The dispenser 104 comprises a sink 202 a shower head 204 for dispensing water and cleaning reagents. The dispenser 104 is equipped with different sensors placed at different locations, for example, a proximity sensor 106 that can be placed near the shower head 204 for identifying hands/hands movement; additional camera-type sensors 108 placed on the side for capturing hands movement; a frontal sensor 212 for identifying the user (via a camera & image recognition, voice recognition, iris recognition, finger prints recognition etc.); and a reagent cartridge sensor 220 for cartridge and cleaning reagent identification.

A specific protrusion structure is part of the reagent cartridge 216 structure with predefined, length, depth, height, shape and angles so that the composition of all parameters create a unique key structure which is fitted and recognized by the Keyhole which is part of "reagent dispenser" in the hygiene station. The cartridge 216 comprises a ventilation/pressure removal opening 218. The reagent cartridge 216 also comprises holding brackets and structure stabilizer 214.

Negative pressure ventilation—Is a method to eliminate a vacuum formation inside the cartridge from one side and addition of positive pressure. By this method, the system can dose liquid very accurately, and also this assures that most of the reagent fluid will be utilized and dispensed.

Reagent Cartridge Delivery tube—Is a tube built in the cleaning reagent cartridge 216 and is a tubing connector channel through which the cleaning reagent is pumped/pressed from the container to the shower head 204.

Base Spring gripper—physical fitting to a spring mechanism that reassures that the cartridge is located in the right position. This is also a triggering sensor that confirms there is a reagent cartridge currently in the system. Under base springer gripper is a pressure sensor that verifies if the cartridge is empty and needs to be replaced.

System Mounting connector with shape pattern recognition—Keyhole

Fast Vacuum grip connector to reagent cartridge delivery tube—Part of the Keyhole.

The reagent and water dispensing unit 104 registers via the processor and memory different handwashing data parameters during and after each handwashing operation.

The handwashing data parameters may comprise: biometric identification (or alternatively personal tag identification, name associated with personal tag), dispensing unit identification, date and time, location, and duration of handwashing.

In some embodiments the hand washing system comprises a face-recognition module. The face-recognition module can serve as the personal tag reader for identifying an individual or serve as an addition to the personal tag reader.

The hand washing system also comprises a server 102 connected to the reagent and water dispensing unit 104 for receiving and analyzing handwashing data parameters and other operational roles. The server 102 analyzes handwashing data from one or more locations and can issue different reports and recommendations regarding the behavior of different users and their compliance or not with the required regulations. The "server" 102 can be implemented as a single computing server, or as one or more computers in a single or multiple geographical locations.

The server 102 can collect and store usage data from one or more reagent dispensing units. The data collected can serve as a backup for data stored locally by the reagent and water dispensing unit 104, and in addition be aggregated and analyzed per each reagent and water dispensing unit 104, per geographic location and globally (for all reagent and water dispensing units 104).

The collected usage data can be analyzed in conjunction with other parameters (databases) for example with weather information, health parameters (sickness rate at location), employee performance etc.

The server 102 can initiate remote firmware updates of the reagent and water dispensing units 104.

The server 102 can monitor and analyze the reagent and water dispensing unit's 104 status (through different sensors) and alert the service support team when it's time for regular maintenance work or to examine a malfunction of the system. Examples of such sensors include, but are not limited to:

1) Camera 108—one or more cameras 108 can capture images (still and/or video) periodically or at predefined events (when a user approaches or uses the system). The image or images are analyzed in real-time or offline. For example, when a user washes his hands, the system verifies that the hands are placed in the right place, and that the user actually washes his hands. The image analysis can be performed either locally or remotely by the server.

2) infrared sensors 106—shape movement and obstacle verification, based on light diffraction or any similar application. Verifies that hands are in place and hands movement according to the hand washing practice.

3) volume sensors 106—shape movement and obstacle verification, based on sound diffraction or any similar application. Verifies that hands are in place and hands movement according to the hand washing practice. Linked to a server algorithm.

4) Acoustic sensors 106—shape movement and obstacle verification, based on sound diffraction. Verifies that hands are in place and hands movement according to the hand washing practice. Linked to a server algorithm.

5) Water sensor—for water level measurement.

6) Reagent level sensor—the pressure sensor beneath the spring of the cartridge stand. According to the weight of the cartridge 216, the system knows how to calculate the amount of reagent that remained in the cartridge 216.

The server 102 and/or the reagent and water dispensing unit 104 track and confirm that the individual actually washes his hands correctly (according to the defined protocol/requirements), that is that the hands are and remain in the right location for receiving reagent and water and that the individual moves his hands appropriately during the hand washing cycle. The verification is done via visual (camera 108) sensing by image analysis of multiple frames captured and analyzing the different position of the hands and deducting their movement. The verification can further be enhanced by acoustic sensing 106 and deducting from the echo and sound analysis that the hands are actually moving.

The server 102 tracks also the state and status of the water and reagent in the unit via the relevant reagent and water sensors.

At cases when the user authentication is performed locally at the water and reagent dispensing unit 104, the server 102 delivers periodically updates regarding new authorized users and changes in previously authorized users.

Figure 3:
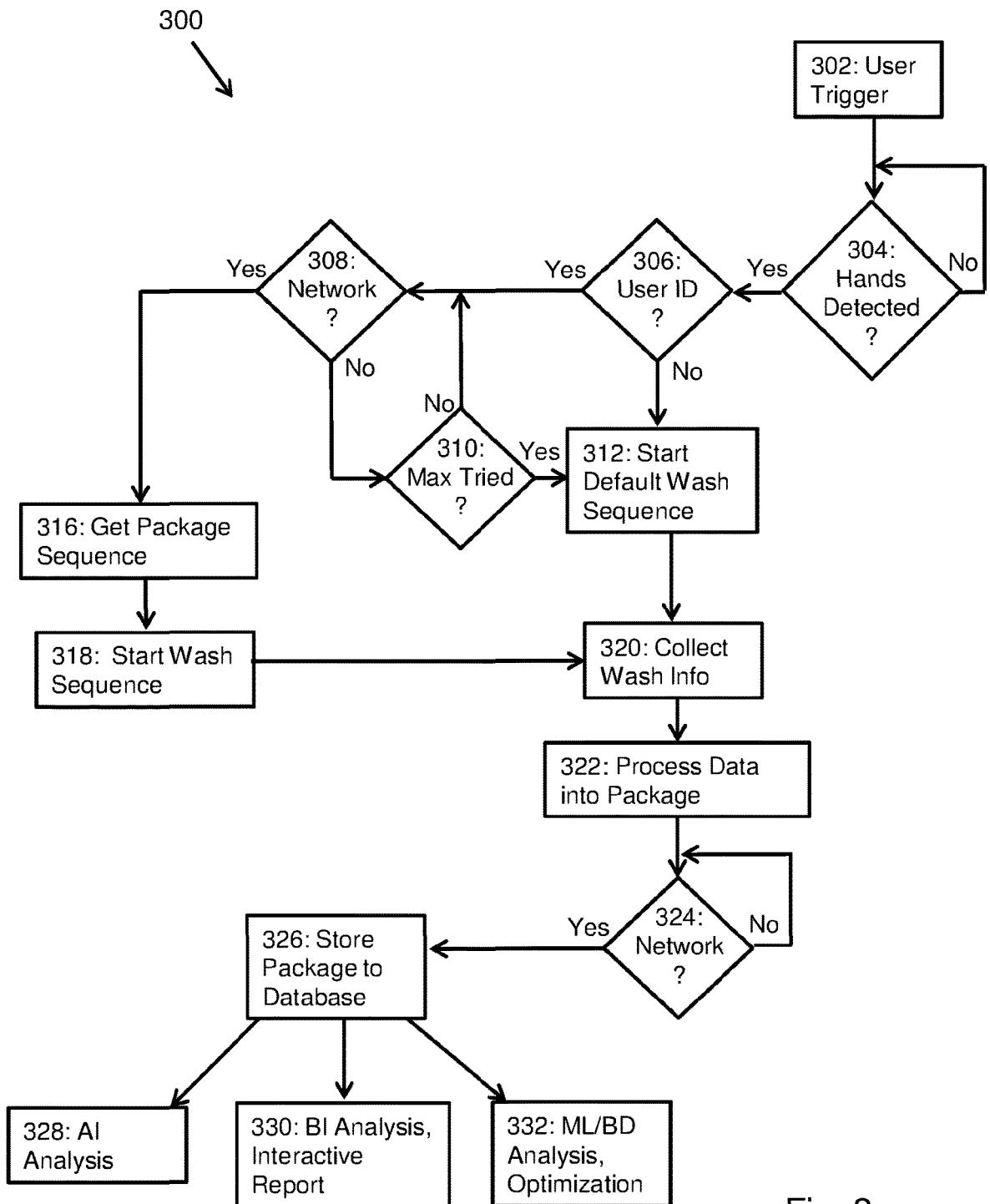
FIG. 3 is a flow chart for a hand washing operation according to an embodiment of the invention.

Reference is now made to FIG. 3 showing a flow chart for a hand washing operation according to an embodiment of the invention, showing hand-washing sequence when the connection to the server 102 is either available or not.

In step 300, the process starts. In step 302, a user triggers the system either automatically after his presence is identified by the sensors 106, 108 or if the user triggered the system manually, for example, but pressing a start button. In step 304, the sensors 106, 108 identify the user's hands as place in the appropriate place for washing. In step 306, the identification unit 110 tries to identify the individual. If the individual is identified, in step 308, the system checks if a network connection to the server 102 is available. If the server 102 can be reached, in step 316, an appropriate hand-washing sequence is assigned to the user and sent to the dispensing unit 104. The hand-washing process starts in step 318.

If a network connection is not available, in step 310, the system tries to establish the connection a predetermined amount of times. If at the end, the server 102 is not available, in step 312, a default hand-washing sequence is performed.

In step 320, washing data is collected then data is processed in a package in step 322. In step 324, the system tries to establish a network connection to the server 102 and then and the package is stored in the database in step 326. The stored data is then analyzed for artificial intelligence analysis in step 328, for business intelligence interactive reporting in step 330, and for machine learning/business data analysis and optimization in step 332.

Figure 4:
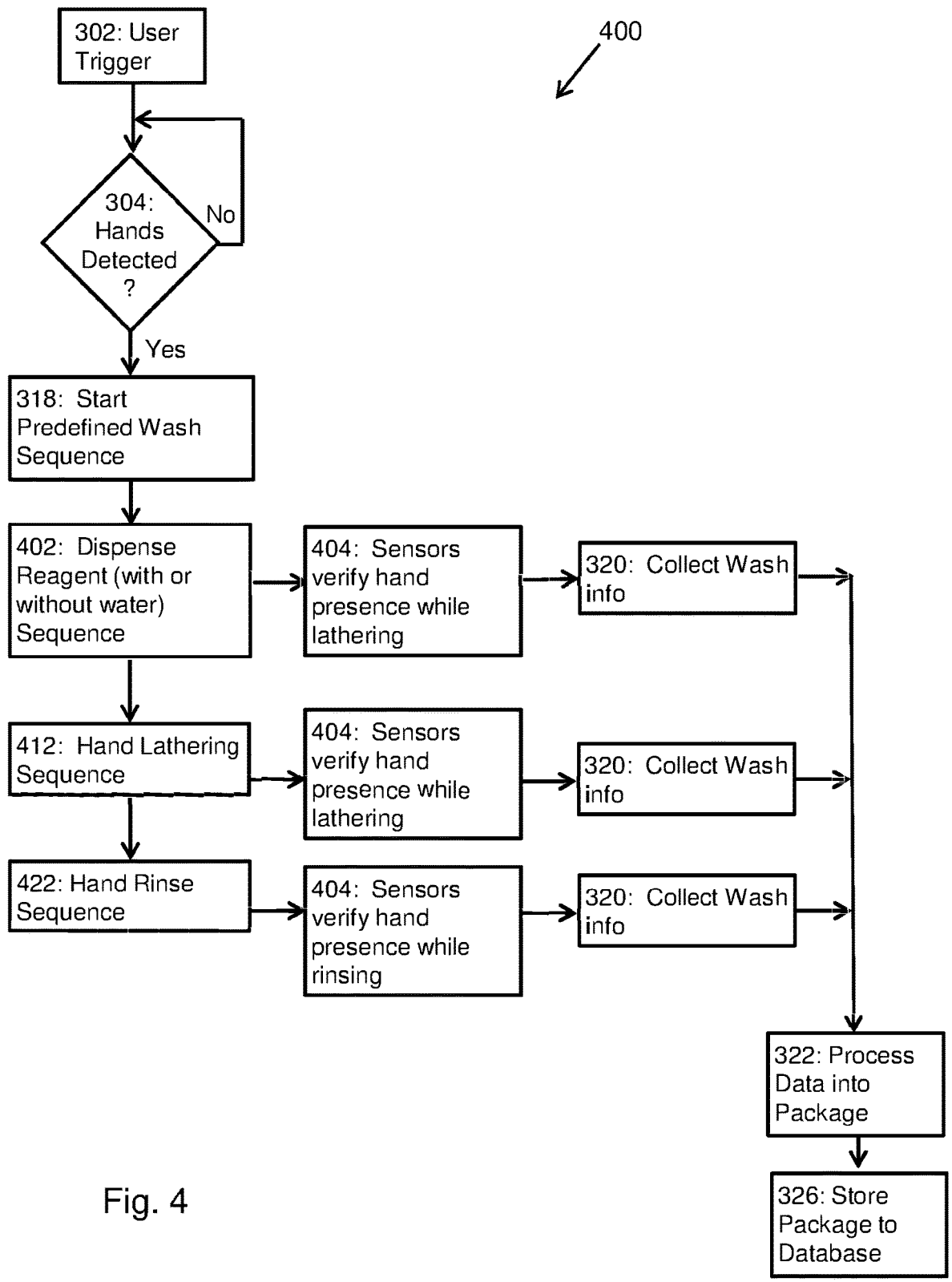
FIG. 4 is a flow chart for a hand washing operation according to an embodiment of the invention.

Reference is now made to FIG. 4 showing a flow chart for a hand washing operation according to an embodiment of the invention, and the system always dispenses a default hand-washing sequence.

In step 400, the process starts. In step 302, a user triggers the system either automatically after his presence is identified by the sensors 106, 108 or if the user triggered the system manually, for example, but pressing a start button. In step 304, the sensors 106, 108 identify the user's hands as place in the appropriate place for washing. The hand-washing process starts in step 318 according to a default hand-washing sequence.

In step 402, one or more cleaning reagents are dispensed for a predetermined amount of time (according to the protocol of the pre-defined hand-washing sequence), water may be dispensed too. In step 412, a hand lathering sequence is performed and in step 422, a hand rinsing sequence is performed. In step 404, the sensors 106, 108 verify that the hands remain in the appropriate location for washing and rinsing and hands movements for lathering and in step 320 washing data is collected In step 320, washing data is collected then data is processed in a package in step 322. Then the package is stored in the database in step 326.

Figure 5:
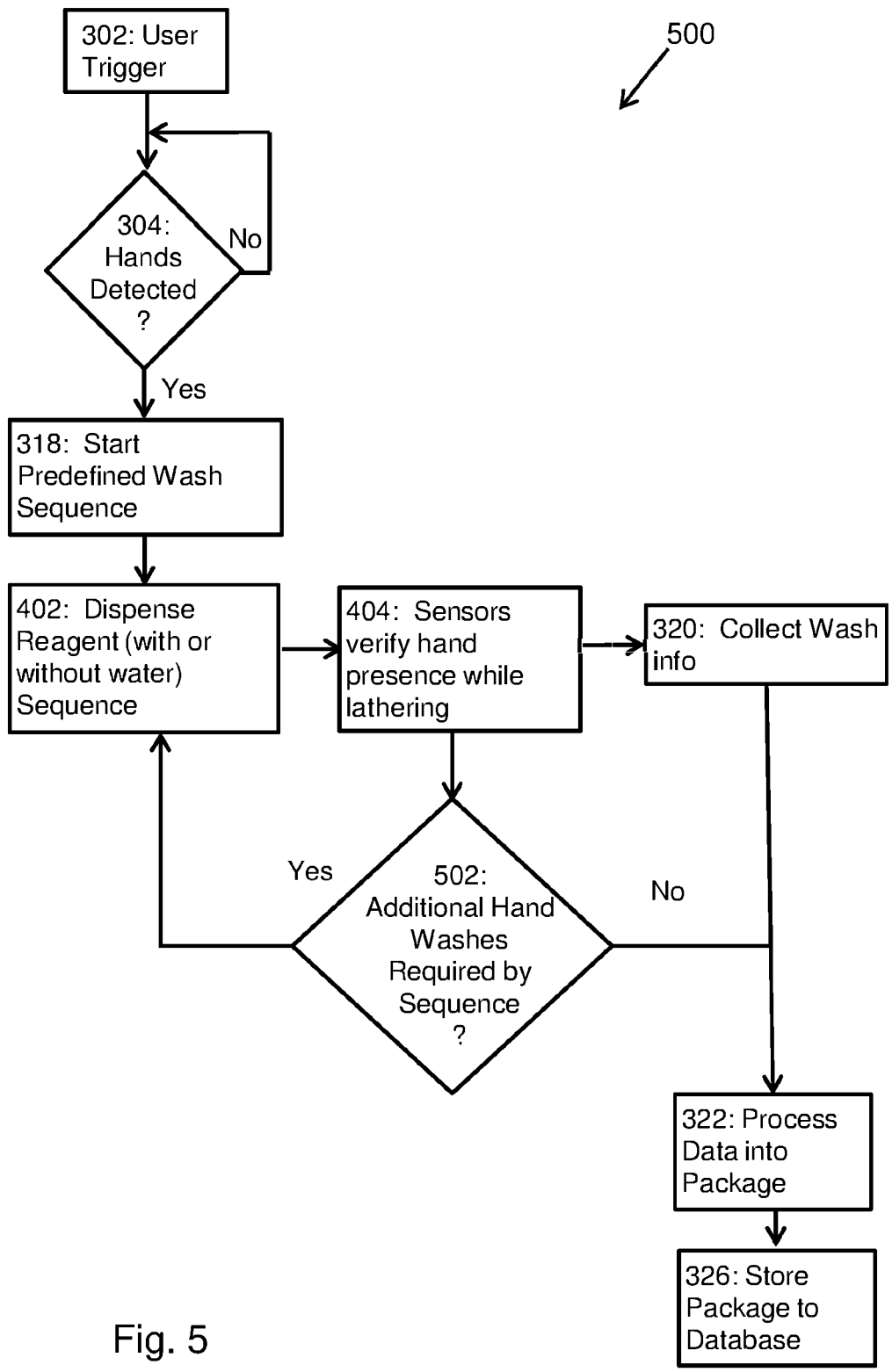
FIG. 5 is a flow chart for a hand washing operation according to an embodiment of the invention.

Reference is now made to FIG. 5 showing a flow chart for a hand washing operation according to an embodiment of the invention.

In step 302, a user triggers the system meaning that a user is ready to begin washing his hands. The triggering occurs after the identification unit 110 has identified the individual and a hand-washing sequence has been assigned to him. In step 304, the dispenser unit's 104 sensors 106, 108 seek to detect the individual's hand in the allocated location for hand washing. After the hands are detected in the right location, in step 318, the assigned hand-washing sequence starts.

In step 402, one or more cleaning reagents are dispensed for a predetermined amount of time (according to the protocol of the assigned hand-washing sequence), water may be dispensed too. In step 404, the sensors 106, 108 verify that the hands remain in the appropriate location for washing, and in step 320 washing data is collected. In step 502, the system returns to step 402 if the hand-washing sequence was not completed, and if the hand-washing sequence is complete, then data is processed in a package in step 322 and the package is stored in the database in step 326. The user has finished to wash his hands.

Figure 6:
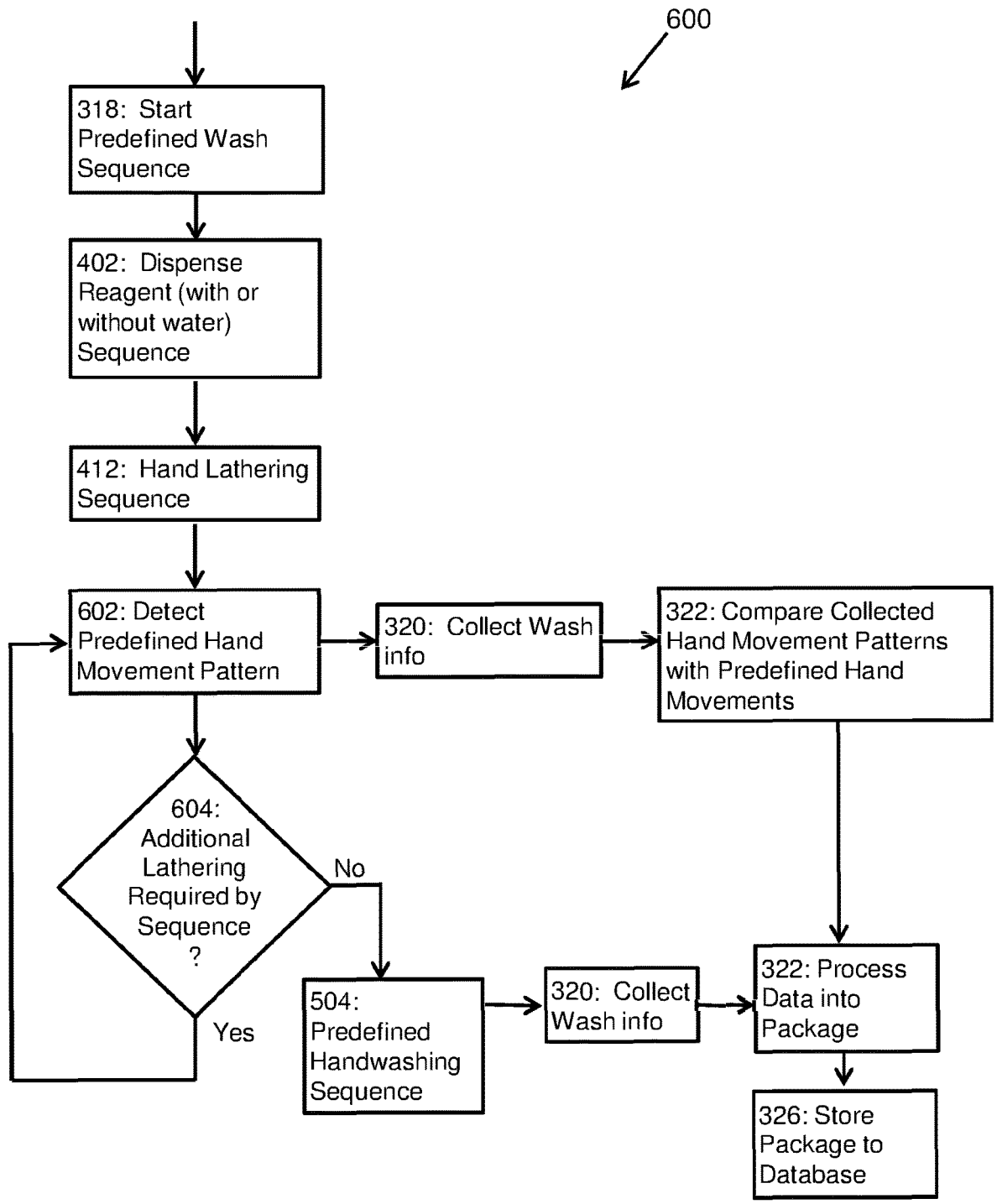
FIG. 6 is a flow chart for a hand washing operation according to an embodiment of the invention.

Reference is now made to FIG. 6 showing a flow chart for a hand washing operation according to an embodiment of the invention, where the system examines the user's actual hand movement pattern when performing the assigned hand washing sequence. In some cases, the required handwashing sequence will be composed of dispensing a plurality of cleaning reagents (in separate steps) wherein hand movements need to be detected and verified in each step.

In step 600, the process starts. In step 318, the assigned hand-washing sequence starts. In step 402, one or more cleaning reagents are dispensed for a predetermined amount of time (according to the protocol of the assigned hand-washing sequence), water may be dispensed too. In step 412, the hand lathering sequence is performed. In step 602, the sensors 106, 108 detect and record the user's hand movement pattern, and in step 320 washing data is collected. In step 622, the recorded hand movement patterns are compared to the predefined (required) hand movement pattern in each step of the hand-washing sequence and a matching score is produced.

In step 604, the system returns to step 604 if additional or different reagent lathering is required by the sequence, and if not then in step 504 the predefined hand-washing sequence performed and, then in step 320, washing data is collected and processed in a package in step 322 and the package is stored in the database in step 326. The user has finished to wash his hands.

Reference is now made to FIGS. 7*a*-7F demonstrate hand movements according to an example of a hand-washing sequence.

Figure 7A:
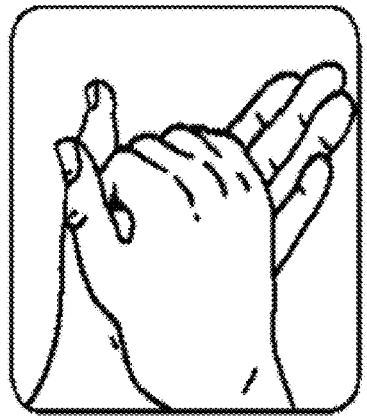
FIGS. 7a-7F demonstrate hand movements according to an example of a hand-washing sequence.

FIG. 7*a* illustrates a pattern where the user is required to rub hands palm to palm.

Figure 7B:

FIG. 7*b* illustrates a pattern where the user is required to rub right palm over back left hand and left palm over back of right hand.

Figure 7C:
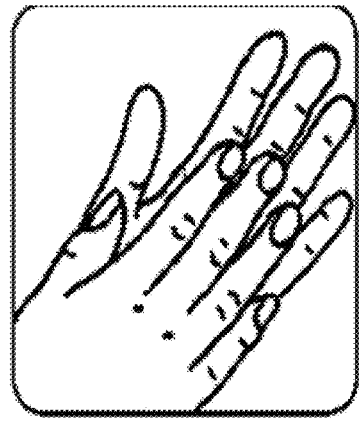

FIG. 7c illustrates a pattern where the user is required to rub palm to palm while with fingers interlaced.

Figure 7D:
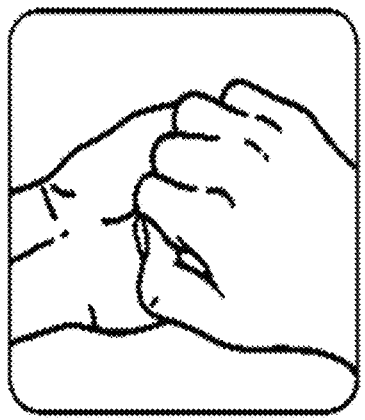

FIG. 7d illustrates a pattern where the user is required to rub thumb in a rotating manner followed by the area between index finger and thumb for both hands.

Figure 7E:

FIG. 7e illustrates a pattern where the user is required to Rub backs of fingers to opposing palms with fingers interlocked.

Figure 7F:
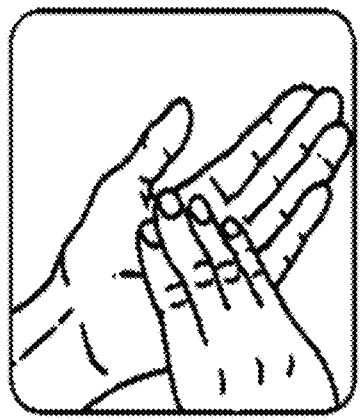

FIG. 7f illustrates a pattern where the user is required to Rub the tips of the fingers rotationally backwards and forwards with clasped fingers of right hand in left palm and vice versa.

Example 1—Handwashing Cycle

The following flow is an example of a possible sequence of operations of a handwashing system.
1. (Proximity sensor) Wait for a presence
2. (Identification module) Identify user
3. (Server/dispensing unit) Validate user (locally or remote)
4. (Server) send the dispensing unit an assigned handwashing sequence for the identified user, instruct to start handwashing cycles
5. (Reagent dispenser) Pour reagent for 1 second
6. Wait 2 seconds
7. (Sensor) Validation that user is still washing hands
8. (Water connection) Pour water for 0.4 seconds
9. Wait 5 seconds
10. (Sensor) Validation that user still washing hands
11. (Water connection) Pour water for 1.3 seconds
12. Wait for 2 seconds
13. (Sensor) Validation that user still washing hands
14. (Water connection) Pour water for 1.3 seconds
15. Wait for 2 seconds
16. (Sensor) Validation that user still washing hands
17. (Water connection) Pour water for 1.3 seconds
18. Wait for 2 seconds
19. (Sensor) Validation that user still washing hands
20. (Water connection) Pour water for 1.3 seconds
21. Wait for 2 seconds
22. (Processor) Register handwashing data parameters
23. (Processor) Send handwashing data parameters to server The hand washing system can issue notifications to users of personal tags that the user needs to wash his hands. The notification can be issued after a predetermined event was logged. In one example, medical doctors (or any other health care professionals in contact with patients) are given personal tags that track their hand washing operations (date, time and if relevant location). Patients are tracked via personal tags or via other technologies, for example, tracking when a patient enters the office of the doctor (a volume detector, infrared sensor etc.). When it is determined that a patient has come to see the doctor, the system checks the last hand washing operation that was registered in the system and verifies against the applicable hygiene compliance regulations if the doctor needs to wash his hands now. If so, a notification is issued to the doctor via any mean: an alert on the personal tag, an SMS or other mobile message to his mobile phone, a notice shown on his computer system etc.

Other examples of notifications can include: every given amount of time (for example, a doctor must wash his hands at least once every 30 minutes); when entering certain locations (such as a surgery room); when leaving certain locations (such as the toilettes) and more. In the food industry, notifications may be issued at preset times (for example, when starting work and then every hour); when exiting certain locations (like toilettes), when entering certain locations (like a food storage) etc.

Although the invention has been described in detail, nevertheless changes and modifications, which do not depart from the teachings of the present invention, will be evident to those skilled in the art. Such changes and modifications are deemed to come within the purview of the present invention and the appended claims.

It will be readily apparent that the various methods and algorithms described herein may be implemented by, e.g., appropriately programmed general purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices.

The term "computer-readable medium" refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The invention claimed is:

1. A hand washing system, comprising:
   (i) an integrated reagent and water dispensing unit comprising:
      a) a personal identification unit comprising a tag reader or a biometric identification module;
      b) a reagent dispenser comprising multiple slots for holding multiple reagent cartridges;
      c) at least one reagent cartridge comprising a cleaning reagent and a sensor for identifying the specific cleaning reagent;
      d) a connection to a water source;
      e) one or more sensors for monitoring the handwashing sequence;
      f) a controller comprising a processor and memory for managing the unit's operations and for storing handwashing data parameters; and
   (ii) a server connected to said reagent and water dispensing unit for receiving and analyzing handwashing data parameters,
   wherein when an individual approaches the integrated reagent and water dispensing unit, the personal identification unit identifies the individual, the controller send's the individual's information to the server and receives a hand-washing sequence assigned to the individual according to his profile, the reagent and water dispensing unit dispenses one or more cleaning reagents and water according to said hand-washing sequence assigned to the individual, the one or more sensors confirm that the individual has performed the assigned hand-washing sequence correctly and the processor sends the server handwashing data parameters.

2. The hand washing system of claim 1, wherein the personal tag is a Radio Frequency Identification (RFID) tag, a Near Field Communication (NFC) tag, a magnetic card, a card with a smart chip, a card with a visual symbol.

3. The hand washing system of claim 1, wherein the personal tag comprises a status indicator.

4. The hand washing system of claim 3, wherein the status indicator issues a visual or audible alert when it is determined that the individual wearing the personal tag should go to wash his hands.

5. The hand washing system of claim 4, wherein said alert is issued after a predetermined time from the last registered hand washing, when in proximity to a predetermined person, object or location, after a predetermined action, or any combination thereof.

6. The hand washing system of claim 1, wherein the biometric module comprises one or more: cameras, Time-of-Flight (ToF) cameras, voice recognition sensors, touchless fingerprints sensors, face recognition modules, iris identification sensors.

7. The hand washing system of claim 1, wherein the assigned hand-washing sequence takes into consideration regulatory requirements and allergies and sensitivities of the individual.

8. The hand washing system of claim 1, wherein the one or more sensors comprise a camera, infrared sensors, volume sensors or acoustic sensors.

9. The hand washing system of claim 1, wherein the cleaning reagent comprises soap, foam, chemical sanitizer, biological sanitizer, a sanitizer or any combination thereof.

10. The hand washing system of claim 1, wherein handwashing data parameters comprise: personal tag identification, name associated with personal tag, dispensing unit identification, date and time, location, and duration of handwashing.

11. The hand washing system of claim 1, wherein the hand-washing sequence requires the individual to move his hands in a predetermined way in one or more steps of the sequence.

12. The hand washing system of claim 11, wherein the one or more sensors confirm that the individual moved his hands in the predetermined way in one or more steps of the sequence.

13. The hand washing system of claim 11, wherein a compliance score is produced by comparing the individual's hand movements pattern as recorded by the one or more sensors to the required hand movements pattern, as specified in the assigned handwashing sequence.

14. The hand washing system of claim 1, wherein the one or more sensors comprise a camera, infrared sensors, volume sensors or acoustic sensors.

15. A hand washing method comprising the steps of:
   (i) identifying an individual;
   (ii) sending the individual's identification and location to a server;
   (iii) receiving from the server a hand-washing sequence for the individual according to his profile;
   (iv) dispensing one or more cleaning reagents and water according to said hand-washing sequence assigned to the individual;
   (v) confirming via one or more sensors that the individual's hands are at location apt for receiving reagent and water and that the individual moved his hands in the predetermined way in one or more steps of the sequence;
   (vi) sending to a server handwashing parameters.

16. The hand washing method of claim 15, wherein the cleaning reagent comprises soap, foam, chemical sanitizer, biological sanitizer, a sanitizer or any combination thereof.

17. The hand washing method of claim 15, wherein handwashing data parameters comprise: personal tag identification, name associated with personal tag, dispensing unit identification, date and time, location, and duration of handwashing.

18. The hand washing method of claim 15, wherein the hand-washing sequence requires the individual to move his hands in a predetermined way in one or more steps of the sequence.

19. The hand washing method of claim 18, wherein the one or more sensors confirm that the individual moved his hands in the predetermined way in one or more steps of the sequence.

20. The hand washing method of claim 18, wherein a compliance score is produced by comparing the individual's hand movements pattern as recorded by the one or more sensors to the required hand movements pattern, as specified in the assigned handwashing sequence.

* * * * *